United States Patent [19]

Pate et al.

[11] Patent Number: 5,063,505

[45] Date of Patent: Nov. 5, 1991

[54] COMPUTER AIDED MANAGEMENT SYSTEM FOR PUBLIC UTILITY WASTEWATER COLLECTION SYSTEMS

[75] Inventors: Gerry E. Pate; Ronald L. Mullinax, both of Houston; Alexander C. Sutton, Kingwood; Jeff E. Ross, Houston, all of Tex.

[73] Assignee: Pate Systems, Inc., Tex.

[21] Appl. No.: 368,046

[22] Filed: Jun. 16, 1989

[51] Int. Cl.$^5$ ............................................. G06F 15/20
[52] U.S. Cl. .................................... 364/400; 364/401
[58] Field of Search .............................. 364/400, 401

[56] References Cited

PUBLICATIONS

Sansys for Sewerage, Expertware Development Corp., Jul. 1, 1986.

Nelson, J. K. et al., Computer Control at the Metro Denver Sewage District, Apr. 27-May 4, 1985.
Operator 10 Treatment Plant Software 2.10, Macola, Inc.

Primary Examiner—Jerry Smith
Assistant Examiner—Russell Cass
Attorney, Agent, or Firm—Pravel, Gambrell, Hewitt, Kimball & Krieger

[57] ABSTRACT

A computer implemented method for managing a public utility wastewater collection system that involves the steps of establishing a computer accessible database, selecting an area for analysis, selectively reviewing and/or modifying the database and determining the wastewater flow and surface hydraulic grade for areas of interest.

25 Claims, 16 Drawing Sheets

```
                WASTEWATER LINE FACT CARD

LINE NUMBER..................................  1001
LINE DESCRIPTION.........................
LINE TYPE......................................  REINFORCED CONCRETE

UPSTREAM MANHOLE NUMBER..........  1002
DOWNSTREAM MANHOLE NUMBER......  1001

DIAMETER (INCHES)..........................  30.00
LENGTH (FEET)................................  80.00
MANNING'S n..................................  0.0130

DOWNSTREAM FLOW LINE (FEET)......  33.95
UPSTREAM FLOW LINE (FEET)..........  34.65

FLOW TYPE.....................................  GRAVITY LINE

=PRIOR PgUp=-10 PgDn=+10 Home=FIRST End=LAST Esc=QUIT
Ctrl. PgPu=UPSTREAM Ctrl. PgDn=DOWNSTREAM F8=DOWN F9=UP MH
Delete=DELETE LINE Insert=ADD NEW LINE
F3=FIND LINE   F5=UPDATE LINE
```

FIG. 7

```
                WASTEWATER MANHOLE FACT CARD

MANHOLE NUMBER..........................  1001
MANHOLE DESCRIPTION....................  SLEEPY HOLLOW LIFT STATION
MANHOLE TYPE..............................  DISCHARGER (LIFT STATION)

CENSUS TRACT ID...........................  406.00
SERVICE AREA NAME.......................  DM01
MAP REFERENCE NUMBER.................  DM01

DIAMETER (INCHES)..........................  36.00
DEPTH (FEET)..................................  23.50
GROUND SURFACE ELEVATION (FEET)  57.45
X COORDINATE................................  3132223.473990
Y COORDINATE................................  713664.280482
OVERFLOW FLOWLINE (FEET)............  50.00
OVERFLOW DIAMETER (INCHES)........  24.00
OVERFLOW NAME............................  DSCHRG PIPE FOR LIFT STATION

=PRIOR Home=FIRST End=LAST PgDn=+10 PgUp=-10 Esc=QUIT
Delete=DELETE MH   Isert=ADD NEW MH   F3=FIND MH   F5=UPDATE MH
```

FIG. 8

```
                    PUMP FACT CARD

MANHOLE NUMBER......................... 1001
        PUMP NUMBER...............................     1
        PUMP MAKE.................................. FLYGHT
        PUMP MODEL.................................
        PUMP SERIAL NUMBER....................
        PUMP CAPACITY............................. 0.00
        MOTOR MAKE................................
        MOTOR MODEL...............................
        MOTOR SERIAL NUMBER..................
        BRAKE HORSEPOWER..................... 100.00
        PUMP ON LEVEL (FEET)................. 32.00
        PUMP OFF LEVEL (FEET)................ 29.40
        HYDRAULIC EFFICIENCY.................. 72.00000
        INLET PIPE LENGTH (FEET)............ 0.00
        INLET PIPE DIAMETER (INCHES)...... 0.00
        INLET PIPE MANNING'S n................ 0.0100

=PRIOR PUMP
        Esc=QUIT  Home=FIRST MH   End=LAST MH
        F5=EDIT   Delete=DELETE   Insert=ADD NEW
```

FIG. 9

```
                  DISCHARGER FACT CARD

MANHOLE NUMBER......................... 1001
    PERMIT NUMBER............................ 10495.006
    DISCHARGER NAME........................ CITY OF HOUSTON
    PERMITTED FLOW (MGD)................. 3.00
    SERVICE AREA NAME...................... DM01
    STREAM DISCHARGED TO................ SIMS BAYOU

PgDn=NEXT        Home=FIRST       Esc=QUIT
    PgUp=PRIOR       End=LAST         F1=HELP
    Delete=DELETE    F5=EDIT          Insert=ADD NEW
```

FIG. 10

```
         CENSUS TRACT FACT CARD FOR YEAR 1990

CENSUS TRACT ID....... 406.00    CENSUS TRACT AREA.......1154.86
  MDA NUMBER.............. 12       TOTAL FLOW (gpd)......634656.00

UNIT      CORRECTION    FLOW
               POPULATION   FLOW      FACTOR        (gpd)

SINGLE FAMILY....... 4526    90.00     1.00       407340.00
  MULTI-FAMILY......... 1048   80.00     1.00        83840.00
  COMMERCIAL........... 1618   82.00     1.00       132676.00
  INDUSTRIAL...........   80  135.00     1.00        10800.00

PgDn=NEXT  PgUp=PRIOR  Home=FIRST  End=LAST  F3=FIND
  Esc=QUIT  Delete=DELETE THIS CARD  F5=EDIT THIS CARD
  Insert=ADD NEW CARD
```

FIG. 11

```
           MANHOLE MAP FACT CARD

MANHOLE NUMBER.......... 1025
        SERVICE AREA NAME....... DM01

=NEXT   PgDn=+10   Home=FIRST   Esc=QUIT
  =PRIOR  PgUp=-10   End=LAST     F1=HELP
  Delete= DELETE   F5=EDIT   Insert=ADD NEW
```

FIG. 12

```
        SERVICE AREA FACT CARD

SERVICE AREA NAME.................... DM01
    CENSUS TRACT NUMBER.............. 406.00
    PER CENT CENSUS TRACT AREA
    IN SERVICE AREA......................... 49.05

PgDn=NEXT        Home=FIRST      Esc=QUIT
PgUp=PRIOR       End=LAST        F1=HELP
Delete=DELETE    F5=EDIT         Insert=ADD NEW
```

FIG. 14A

```
        SERVICE AREA FACT CARD

SERVICE AREA NAME.................... DM06
    CENSUS TRACT NUMBER.............. 420.02
    PER CENT CENSUS TRACT AREA
    IN SERVICE AREA......................... 13.68

PgDn=NEXT        Home=FIRST      Esc=QUIT
PgUp=PRIOR       End=LAST        F1=HELP
Delete=DELETE    F5=EDIT         Insert=ADD NEW
```

FIG. 14B

```
        SERVICE AREA FACT CARD

SERVICE AREA NAME.................... DM06
    CENSUS TRACT NUMBER.............. 406.00
    PER CENT CENSUS TRACT AREA
    IN SERVICE AREA......................... 3.64

PgDn=NEXT        Home=FIRST      Esc=QUIT
PgUp=PRIOR       End=LAST        F1=HELP
Delete=DELETE    F5=EDIT         Insert=ADD NEW
```

FIG. 14C

```
SERVICE AREA FACT CARD FOR YEAR 1990

SERVICE AREA NAME..................DMO1

MANHOLE WHERE FLOW APPLIED......1035

LOCAL FLOW (gpd)........................ 311298.77
DIVERTED FLOW (gpd).................. 0.00
TOTAL FLOW AT MANHOLE (gpd)..... 757875.68

PgDn=NEXT        Home=FIRST      Esc=QUIT
PgUp=PRIOR       End=LAST        F1=HELP
Delete=DELETE    F5=EDIT         Insert=ADD NEW
```

FIG. 15

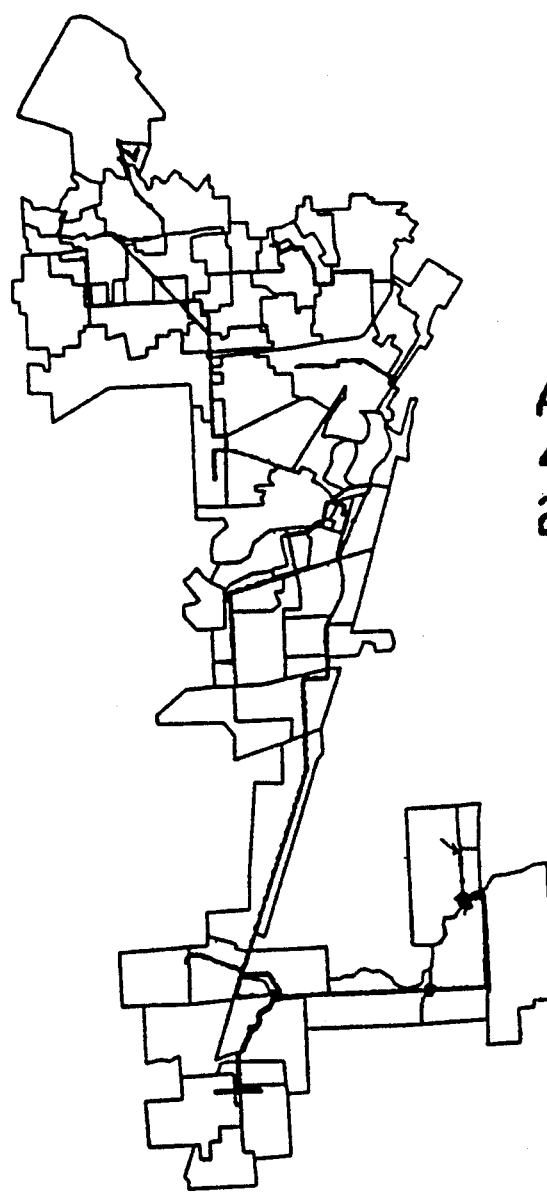
ALMEDA SIMS
4Q
2000 Census
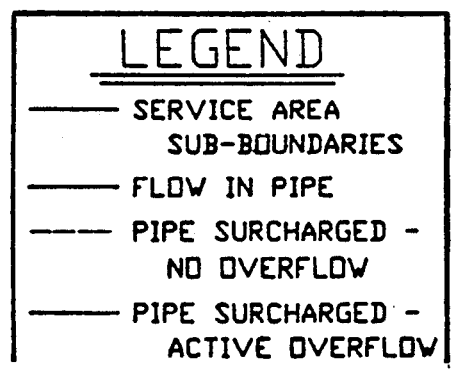
FIG. 16

ALMEDA SIMS YEAR 2000 PROFILE

```
           BASE COST FACT CARD

CONSTRUCTION TYPE.......... BORE AND JACK
    PIPE SIZE (INCHES)............  6.000
    MINIMUM DEPTH (FEET).....  0.000
    MAXIMUM DEPTH (FEET)....  6.000
    BASE COST PER FOOT......  60.000

=NEXT   PgDn=+10   Home=FIRST   Esc=QUIT
   =PRIOR  PgUp=-10   End=LAST   F1=HELP
   Delete=DELETE    Insert=ADD NEW
```

FIG. 19A

```
           SURFACE COVER FACT CARD

SURFACE COVER CODE............. A
   DESCRIPTION OF COVER.......... ASPHALT STREET
   COST OF MULTIPLIER............... 1.000

=NEXT   PgDn=+10   Home=FIRST   Esc=QUIT
   =PRIOR  PgUp=-10   End=LAST   F1=HELP
     Delete=DELETE   F5=EDIT   Insert=ADD NEW
```

FIG. 19B

```
        EFFLUENT PARAMETERS

SELECT ONE OF THE FOLLOWING CONDITIONS:
                                          ┌─ EFFLUENT PARAMETERS ─┐
1. BASE
2. REVISED BASE                              BOD  :5    mg/1
3. BEST AVAILABLE TECHNOLOGY                 NH3  :2    mg/1
4. NITRIFICATION                             DO   :5    mg/1

<1MGD/>1MGD/PERMIT
ARROW KEYS, CHANGE HIGHLIGHTED ITEM.
ENTER, SELECTS HIGHLIGHTED ITEM.
ESC, QUITS WITH NO ACTION.
```

FIG. 20C

```
        EFFLUENT PARAMETERS

SELECT ONE OF THE FOLLOWING CONDITIONS:
                                          ┌─ EFFLUENT PARAMETERS ─┐
1. BASE
2. REVISED BASE                              BOD  :10/7   mg/1
3. BEST AVAILABLE TECHNOLOGY                 NH3  :3      mg/1
4. NITRIFICATION                             DO   :3      mg/1

<1MGD/>1MGD/PERMIT
ARROW KEYS, CHANGE HIGHLIGHTED ITEM.
ENTER, SELECTS HIGHLIGHTED ITEM.
ESC, QUITS WITH NO ACTION.
```

FIG. 20D

COMPUTER AIDED MANAGEMENT SYSTEM FOR PUBLIC UTILITY WASTEWATER COLLECTION SYSTEMS

FIELD OF THE INVENTION

This invention relates to the computer aided management of complex public works projects and, more particularly, to a computer aided management system for planning and control of a public utility wastewater collection system.

BACKGROUND OF THE INVENTION

In recent years, municipalities have been forced to accommodate rapidly growing wastewater volumes associated with heavy urban development in an increasingly stringent regulatory environment. In particular, regulatory entities have focused on the collection system. The goal is to eliminate discharges of raw sewage to the municipality's streams. These discharges result from collection system overflows and treatment facility bypasses.

As a result of increased volume and increased regulation, municipalities are initiating major improvements to their wastewater systems. They are expending significant financial resources on personnel and assistance to address the definition, the analysis, and the solutions of waste water collection system problems. These improvement programs, estimated to cost in the billions, may be anticipated to include the replacement of treatment facilities, new and/or expanded treatment plants, existing collection system upgrades, and major collection system diversion projects. It inevitably happens that, as a program progresses, changes occur in the area's growth rates and land use. At the same time, it is likely that state regulatory bodies will continue to change water quality standards. The combination of these changes in the growth rate and effluent input and the output standards substantially impact a municipality's improvement programs.

As implemented in present practice, predicting, analyzing, and evaluating responses on a wastewater collection system to a variety of external stimuli, as well as to system modifications and to varying system operating characteristics, is a relatively slow and cumbersome activity. This time-consuming activity is aggravated by the necessity for the everyday planning, scheduling, and monitoring of systems maintenance and the generation of administrative reports. The present practice utilizes extensive manual storage of data and calculation.

In present practice, isolated special purpose computer application programs may be utilized to address specific tasks involved in the prediction, analysis, evaluation, and control processes. For example, spread sheet or database programs exist to be used for data organization. Computer based work order, maintenance scheduling, and maintenance history systems exist to store maintenance data and to issue work orders and maintenance reports. Special application programs exist to model a waste treatment facility, for example, for predicting output parameters into the stream system from given input parameters, and for calculating capacities and overloads. However, utilization of each program requires the extensive manual preparation and manipulation of input data. Therefore, notwithstanding the possible use of these special purpose computer applications programs, the steps in the total management process still require extensive manual effort, both in the steps themselves and in interfacing the manual data information and computer based analytical steps.

The process is not only slow but it is exposed to human error. Furthermore, accomplishing the process requires a high level of skill and judgment. The labor and time intensive nature of the job necessitates that system managers employ outside expertise and/or large in-house staffs. Importantly, the number of scenarios for which a wastewater collection system response can be evaluated is, practically speaking, quite limited by time and manpower constraints.

The use of computers for simulations, modeling, analysis, and systems control in certain areas of industry is known. In the public sector, there is known to exist a system for modeling and analyzing the effect of existing and proposed developments upon "flood control systems". The present system, however, is the kind to apply a systems approach to the management of a wastewater collection system.

The present invention recognizes the need for a unitary computerized management system to permit the centralized and uniform management and control of a wastewater collection system. The present invention accomplishes this goal by encompassing a database including wastewater system parameters and analytical models that, by aid of computer, may be used to predict the response of an actual, or of a proposed, wastewater collection system to a municipality's actual, or forecast, wastewater collection needs. In addition, the invention accomplishes the goal by interfacing with existing computer aided programs to generate administrative reports for utilization by public works department personnel in the management of the maintenance of the wastewater collection system. The present invention presents a systems development approach to the solution of this complex problem, resulting in a computerized management system that can significantly enhance a city's in-house ability to predict collection system needs, evaluate the effectiveness of proposed improvements to solve collection system problems, better direct and control consultant's work efforts, and manage wastewater system expenditures. The invention provides a uniform methodology to be applied system wide for planning and analysis and permits an ongoing planning process to predict, on a timely basis, wastewater facility needs to meet changing regulatory requirements.

SUMMARY OF THE INVENTION

The invention comprises a method for managing a public utility wastewater collection system, utilizing a data processor. The first step is the establishing of a computer accessible database. The database includes wastewater collection system parameters. Important collection system parameters are certain pipe system parameters comprised of the location, with respect to a coordinate system, of sewer pipe and manholes. Also important pipe system parameters are the elevation data with respect to the pipes and the manholes and the pipe and manhole diameter. Further collection system parameters in the database includes predicted customer wastewater input into the collection system along the pipe.

The user of the method has the option of selecting an area of the wastewater collection system for analysis. That area could comprise the totality of the system.

The user has the option to selectively review portions of the data base. These portions would be related to the selected areas of interest. Not only can the user selectively review portions of the database, but the user can selectively modify database parameters to replot proposed changes in the collection system or wastewater loading.

The invention determines the wastewater flow for portions of the pipe system under analysis and the surface hydraulic grades for portions of the pipe system under analysis. The user reviews the surface, hydraulic grade information which describes the loading of the present system. From this information, the user gains insight into changes in the wastewater collection system that might alleviate revealed problem areas such as surcharged pipe and overflowing manholes.

Additional pipe system parameters include the location of waste treatment facilities and pumping stations along the pipe system, together with the backpressure on the pipe from the treatment facility and the head pressure on the pipe from the station.

Large wastewater collection areas may be subdivided into service areas, each organized around a waste treatment facility. The service areas may be further subdivided into subservice areas. The boundary of the subservice area will be determined by the pipe system and the location of the wastewater customers of that pipe system.

Further data of value in computing a surface hydraulic grade is the infiltration input and inflow input along the pipe system. Infiltration input refers to the groundwater that may seep into the pipe. Inflow input refers to the water that enters the pipe system due to unusual circumstances such as heavy rainfall. The material of the pipe and the roughness of the pipe, specified by a Manning number, are also data that can affect the determination of the wastewater flow and the surface hydraulic grade.

Customer wastewater input may be allocated to arbitrarily defined polygons representing surface area. These polygons may include muncipal zoning areas or census tract areas. In the present embodiment, customer wastewater input into the system along the pipe is computed from census data. Census data comes allocated to census tracts. The census data of interest is the categorization of the population in the census tract according to user and the estimated wastewater use per day for each user type. Wastewater input from the customers in a census tract is determined by summing the products of the number of each type of customer within the tract times the estimated daily usage of that customer type. Wastewater customer input is allocated to subservice areas within the census tracts. A simple allocation means is used to allocate wastewater input on a pro rata basis according to collection system subservice area. That is, if a subservice area subsumes half of a census tract, one-half of the customer wastewater input of the census tract will be allocated to that subservice area. The census data of interest that is used includes not only actual census data, but forcasted census data.

Because of the allocation from census tracts of wastewater customer input, a handy method of constructing census tracts is according to municipal zoning areas.

The database of the present invention includes many maps for visual display of the subservice area and collection system serving that area. The database may include the location of major easements and rights of way as well as major thoroughfares in the wastewater collection system area. Accordingly, the maps may be overlayed with the locations of such easements, rights of way and thoroughfares. Data on the maps may be coded by color and/or symbol. Items in the database are assigned a unique symbol-name and can be referred to within the present invention by that name.

The present invention is capable of generating reports. One interesting report is the estimated cost of improvements proposed for the system. The report is based upon historical construction cost factors for that particular collection system stored in the database. The system can also report on the quality and quantity of discharge into the wastewater collection area stream system. This report depends upon certain affluent parameters of waste treatment facilities in the database.

BRIEF DESCRIPTION OF THE DRAWINGS

FIG. 7 illustrates a pipeline data file.

FIG. 8 illustrates a manhole data file.

FIG. 9 illustrates a pumping station data file.

FIG. 10 illustrates a discharger, or wastewater treatment facility, data file.

FIG. 11 illustrates a census tract data file for a given year.

FIG. 12 illustrates a manhole fact data file.

FIGS. 14(a), 14(b), and 14(c) illustrate subservice area data files.

FIG. 15 illustrates a subservice area flow data file.

FIG. 16 illustrates a display of a service area with its subservice areas and showing the not filled, surcharged, or overflow status of a pipe system therethrough.

FIGS. 19(a) and 19(b) illustrate cost factor data files.

FIGS. 20(a), 20(b), 20(c), and 20(d) illustrate the effluent parameters used in computing the stream system analysis.

DETAILED DESCRIPTION OF THE PREFERRED EMBODIMENT

The present invention is designed to be used by municipalities for the planning, control, and management of a wastewater collection system. Accordingly, a person using the present invention would typically be skilled in the engineering disciplines, in particular as they relate to wastewater management and hydraulic analysis. In the preferred embodiment, the method of the present invention would utilize a digital computer system, the computer system including storage means, graphic display means, printing means, plotting means, and means to permit the user to interact with the present invention.

Upon entering the management system program in the normal course, the user should be the beneficiary of an established computer-accessible wastewater collection system database. The program would normally be delivered to a user with a significant database in place. That database, in addition, should have been modified and updated through use. Nonetheless, the user, as well as the program provider, can essentially generate the database textual or graphic data sources. In the preferred embodiment, the database of the present invention is actually comprised of a graphic database, including map and collection system data, and a relational database, including pipe parameters, manhole locations, predicted inputs, location coordinates, and other information as set forth in the summary of the invention.

The system is delivered with at least one service area defined. A service area is an area of the wastewater collection system that is serviced by a particular waste treatment facility. If the municipality is so small that there is only one, or even no, waste treatment facility, then the municipality will have one service area. Boundaries of service areas may be altered, which might occur when particular portions of pipe are diverted to another waste treatment facility.

A service area is subdivided into subservice areas. The subservice area is defined by the pipe system and the wastewater customers whose discharge flows into that pipe collection system. A service area could be sufficiently small that the subservice area and the service area coincide.

Figure 1:
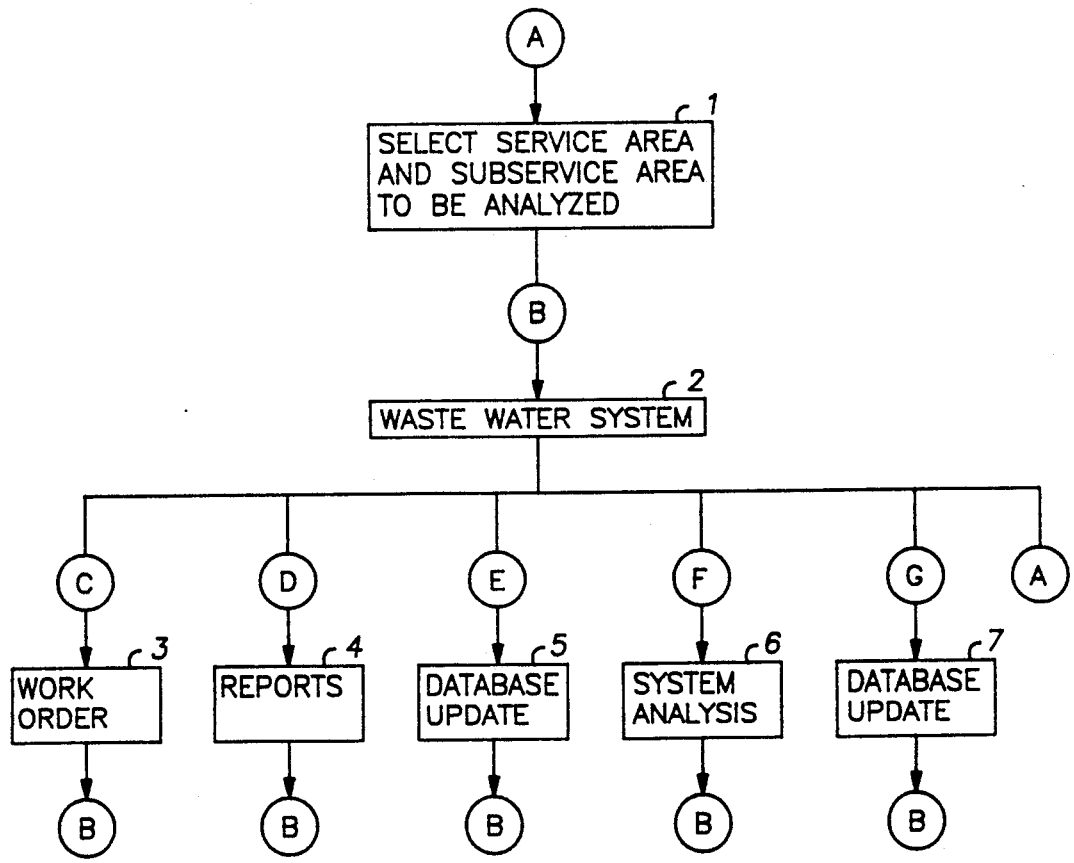
FIGS. 1, 2, 3, 4, 5, and 6 illustrate the operation of the management system in flow chart form.

As illustrated in Box 1, FIG. 1, the user is initially requested to select a service area, and to select subservice areas within that service area, that are to be the subject of analysis. The area selected could comprise the whole wastewater collection area.

Subsequently, as illustrated by FIG. 1, Box 2, the user enters wastewater system module B of the program. In the wastewater system module, the user has the option of producing work orders, producing reports, reviewing and/or updating the database, entering the hydraulic system analysis, and reviewing and/or updating the cost factor data. The above series of choices is illustrated by elements C, D, E, F, and G of the flow chart of FIG. 1. In addition, the user can exit wastewater system module B and return to select service area and subservice area A in order to analyze a different portion of the collection system.

Figure 2:
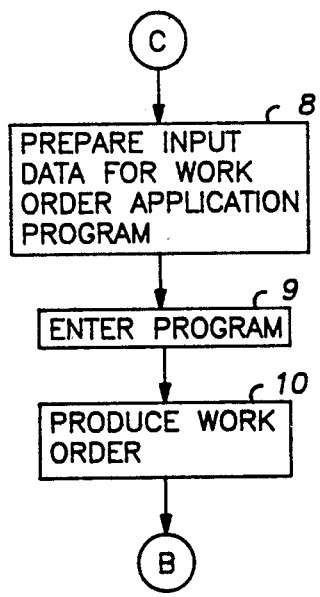

Work order option C of the wastewater system module is illustrated in more detail in FIG. 2. The management system program is designed to interface with an existing program that generates work orders and other associated maintenance and management documents. In particular, the present embodiment interfaces with the wastewater collection system administrative management software developed by Hansen Software, Inc. This program, in its own right, tracks work order histories, customer complaints, maintenance cost management data, field inspection, and preventative maintenance information. In one application, work order module C first prepares input data for the work order application program based upon an approved solution to wastewater collection system problems developed through analysis module F. This input information may include proposed additions to the pipe system. Module C then calls up the work order application program to produce the necessary work orders or other documents. In the example of working on an existing pipe system, the report might include the location or address of the work order maintenance to be performed, and major thoroughfares which would be affected by the construction. The capacity to integrate a planning program with an operation program is one feature of the unitary nature of the management system program. After production of the requisite documents, the user returns to the option selection point B in the wastewater system module.

Figure 3:
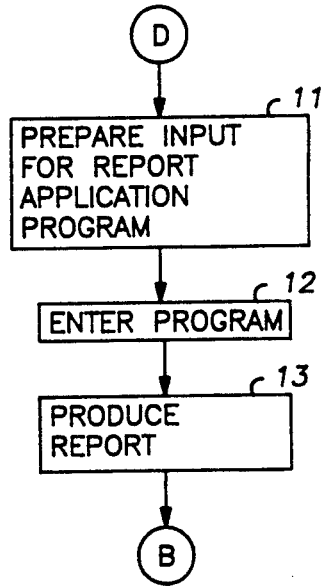

Report module D of FIG. 1 is illustrated in more detail in FIG. 3. Similarly to the work order module C, the report module D is a feature of the unitary nature of the management system. Module D is designed to generate the particular required municipal and interoffice reports of a specific user in regard to the status of the wastewater collection system. The report module first prepares input data for the work report applications program by specifying the portion of the collection system. The type of report desired is then specified by the user. Report module D proceeds to access the database for the area specified by the user and retrieves information required for the specified report and formats the information as required. The user is then returned to option selection point B of the wastewater system module. One important report produced is a report of the cost estimate of modifications to the system, as developed in modification module E, tested in analysis module F, and using historical cost factor information from the database. A report on an addition of a new pipe to the system might include location of the proposed addition, pipe requirements, layout of the proposed addition, and major thoroughfares.

Figure 4:
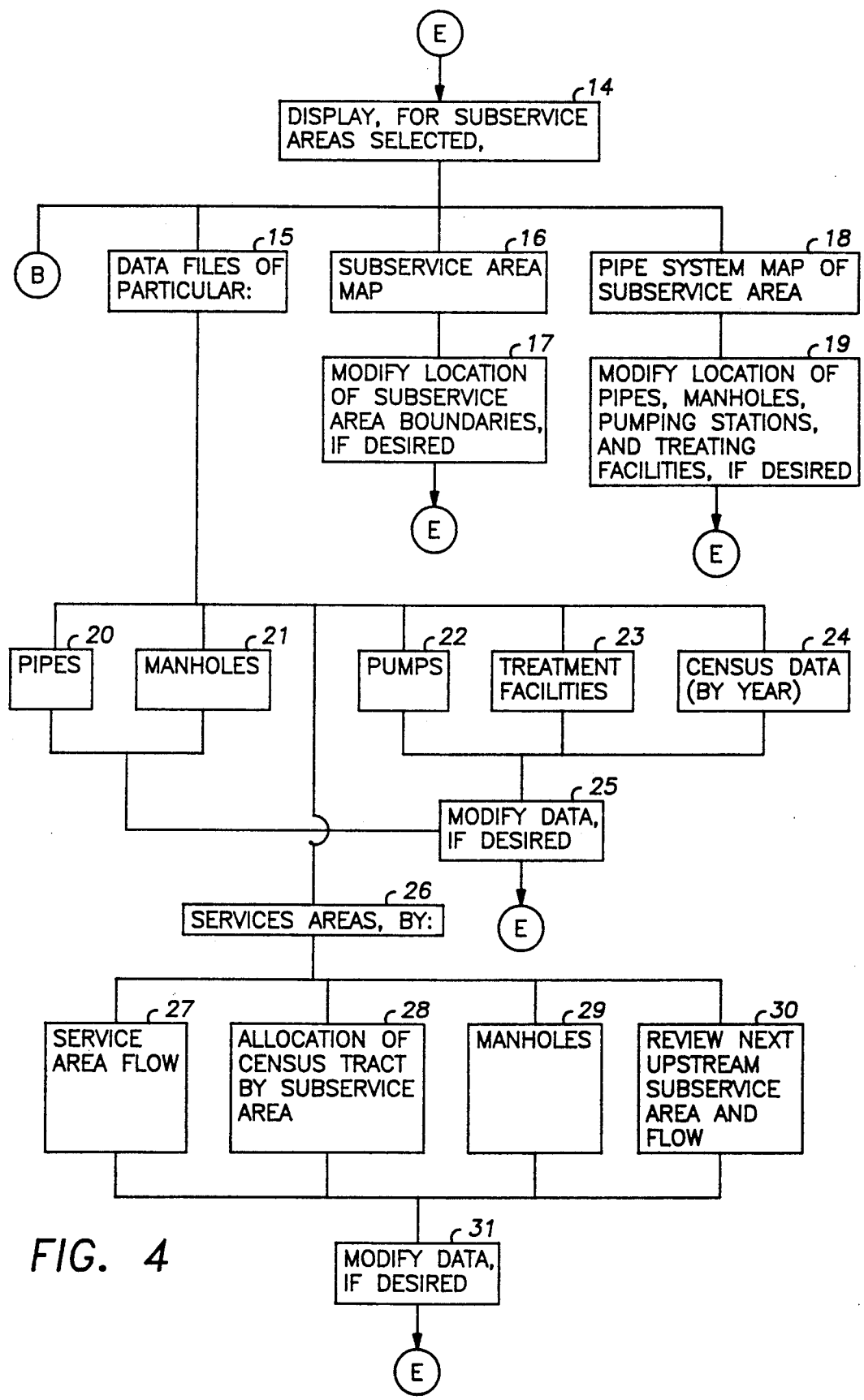

Database update module E of FIG. 1 is delineated in more detail in FIG. 4. The database update module offers the user three basic choices, plus the choice of returning to the option selection point B of the wastewater system module. As delineated by Box 16 of FIG. 4, the user may select to review service and subservice area maps. When the map is presented on the screen, the user, if desired, can modify the location of subservice area boundaries, including the option of creating new subservice areas. This option is illustrated by Box 17. Upon completion, the user returns to the database update option point E. As illustrated by Boxes 18 and 19, the user may select to display the pipe system map for the subservice areas under analysis. When the map is on the screen, the user, if desired, may modify the location of pipes, manholes, pump stations, and treatment facilities. The user may delete any of the above items or add anew any of the above items. Upon completion of this exercise, the user returns to the option point E of the review and update database module.

As indicated by Box 15 of FIG. 4, the user may elect to review data files of particular items. As delineated by Box 20 of FIG. 4, the user may opt to review pipe data files. Each pipe segment between manholes is assigned a unique symbol-name. This name frequently appears on map displays containing the pipe segment. The user reviews pipe segment data files by symbol-name. FIG. 7 illustrates a pipe data file. The user may take this opportunity to create, modify, change, or add to the data in the pipe data file, if desired. This capability is indicated by Box 25. At the completion of this exercise, the user is returned to display option E of the review and update database module.

As illustrated by Box 21 of FIG. 4, the user may review manhole data files. Each manhole is also assigned a unique symbol-name. This name also frequently appears associated with the manhole on displays containing the manhole. The user reviews manholes by symbol-name. FIG. 8 illustrates a typical data file for a manhole. The user, if desired, may create, add to, delete, or change the data in the manhole data file. At the completion of this exercise, the user is returned to the display option point E of the review and update database module.

As illustrated by Box 22, the user may elect to review pumping station data files. Each pumping station is identified by a unique symbol-name. That symbol-name is frequently printed adjacent to the pump station when the maps are displayed. FIG. 9 illustrates a typical pumping station data file. The user may elect to create, add to, delete from, or modify the pump station data file. This is indicated by Box 25. At the completion of the exercise, the user is returned to option decision point E.

As illustrated in Box 23 of FIG. 4, the user may elect to review treatment facility data files. FIG. 10 illustrates a treatment facility data file. (A "discharger" is a wastewater treatment facility.) Each treatment facility data file is identified by a unique symbol-name, frequently printed adjacent the treatment facility in the displays of maps. The user may elect to create, change, add to, or delete data in the treatment facility data file, as indicated by Box 25. At the completion of the exercise, the user returns to point E.

As illustrated by Box 24 of FIG. 4, the user may elect to review the census data, data file. The user must first select a year for the census data file. This year may reflect actual census data or forecast census data. FIG. 11 illustrates a typical census data, data file. Again, the user may elect to create, change, add to, or delete data from this data file, as indicated by Box 25. At the completion of the review and/or update, the user is returned to point E.

As illustrated by Box 25 of FIG. 4, the user may elect to interactively modify any of the underlying data files, including pipe files, manhole files, pump stations, wastewater treatment facilities or census data.

As illustrated by Boxes 28 of FIG. 4, to review the allocation of the census tract and data with respect to the subservice area, the user, first selects a census year and a service area. The allocation of census data file, or set of files, is displayed, as illustrated in FIGS. 14(a), 14(b), and 14(c). FIG. 14(a) illustrates that virtually one half of the users of a particular census tract area have been allocated to the particular subservice area. FIGS. 14(b) and 14(c) illustrate that in a different subservice area, about 13½% of one census tract area and about 3½% of another census tract area have been allocated to that subservice area.

As illustrated by Box 29 of FIG. 4, the user may select to review manholes located in the subservice area. FIG. 12 illustrates a data file for a manhole located in the subservice area.

Figure 13A:
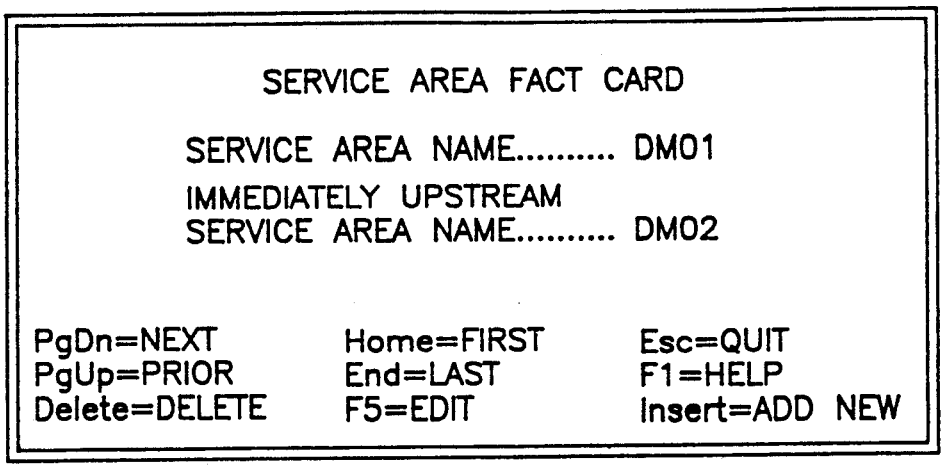
FIGS. 13(a), 13(b), and 13(c) illustrate upstream subservice area data files.
Figure 13B:
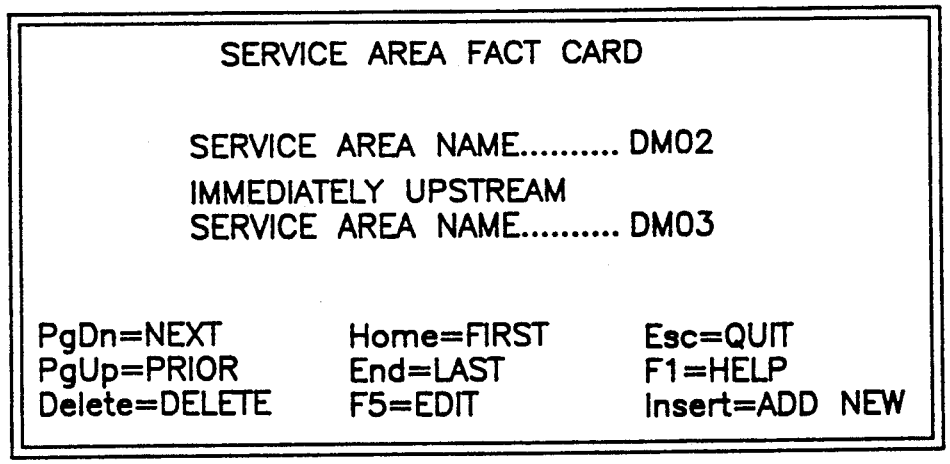
Figure 13C:
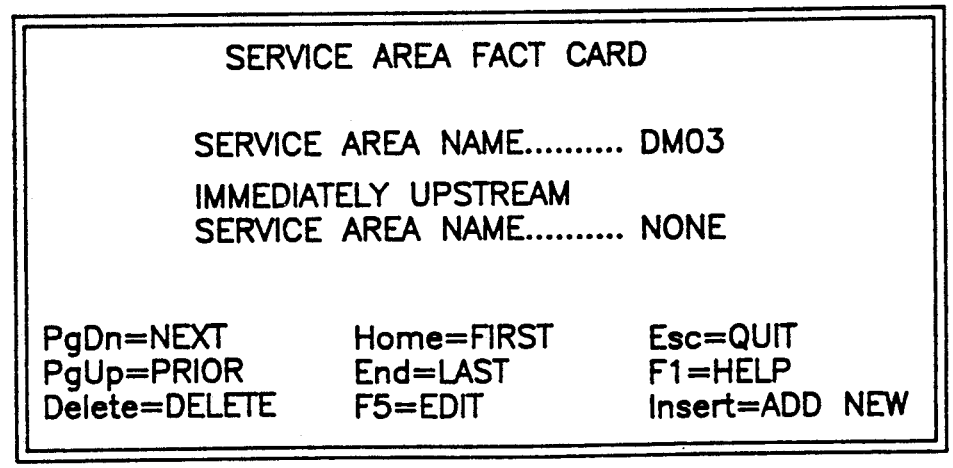

As illustrated by Box 30 of FIG. 4, the user may elect to review the subservice areas immediately "upstream" from the subservice area under investigation. The user may scroll through the upstream subservice areas until there are no more, as illustrated by FIGS. 13(a), 13(b), and 13(c).

As illustrated by Box 27 of FIG. 4, the user may elect to review the subservice area flow data file. FIG. 15 illustrates a subservice area flow data file. The present embodiment of the management system program applies all of the customer wastewater input in a subservice area to one manhole. This service area flow data file shows which manhole, if any yet, has been selected for the input of the customer wastewater. It illustrates not only the local flow at that manhole, derived from the input from the customers in the subservice area, but also the total flow at the manhole, as affected by the flow from upstream pipe. Flow is expressed in units of gallons per day. The total flow at this manhole is the wastewater flow figure for the subservice area.

As illustrated by Box 31, the data in the service area data file may be created, changed, added to, or deleted prior to returning to option point B of the wastewater system module.

Within the wastewater system module, the user may select system analysis module F delineated in FIG. 1. System analysis module F is delineated in more detail in FIG. 5. Upon, entering the system analysis module, as illustrated by Box 32, the user may elect to compute the collection system flow data. This data may already have been determined. If it was, it would have been illustrated on the service area flow data files reviewed above. The collection system flow data is determined by totaling the wastewater customer flow data for each relevant census tract. The wastewater customer flow data for each census tract will be the sum of the products of the number of each type of user within the tract times the estimated wastewater use in gallons per day for that type of user. Having determined the wastewater customer flow data per census tract, that wastewater flow is allocated to each relevant subservice area by, in the present embodiment, a pro rata allocation by area. Starting at the upstream points of subservice areas under investigation, the flow is summed downstream by adding in, at each new subservice area, the flow from the upstream subservice area plus the allocated flow generated by customers within the subservice area. As previously mentioned, in the present embodiment the user may select one or more manholes per subservice area for the allocation and summation of the effluent flow. Having computed the collection system wastewater flow figures, the user is returned to option point F.

Within system analysis module F, as illustrated in Boxes 33, 34, and 35, the user may elect to compute a surface hydraulic grade for the subservice area[s] being investigated. First, the user selects a census year, Box 33. Subsequently, as illustrated by Box 34, the user selects a flow multiplier. The user is permitted to multiply the average daily flow figures by a multiplier, such as 4, to compute the flow through the wastewater collection system for peak times during the day. Subsequent to selecting the census year and flow multiplier, as illustrated by Box 35 of FIG. 5, the system computes the surface hydraulic grade for all pipes in the subservice area, taking into account available data regarding pumping stations and treatment facilities, as well as infiltration and inflow. The diameter, the gradient, and the roughness of the pipes are factors. Pipe roughness appears as a Manning number.

The calculation of surface hydraulic grades is discussed extensively in standard text references. For instance, see Chow, V. T., *Open Channel Hydraulics*, McGraw-Hill Book Company, Inc., New York, 1959; Brater, E. F., and King, H. W., *Handbook of Hydraulics*, 6th Edition, McGraw-Hill, New York, 1976; Henderson, F. M., *Open Channel Flow*, MacMillan Company, New York, 1966; American Society of Civil Engineers, Paper No. 1969, "Varying Flow in Open Channels of Adverse Slope", by Arthur E. Matzke, Journal of American Society of Civil Engineers.

Figure 17A:
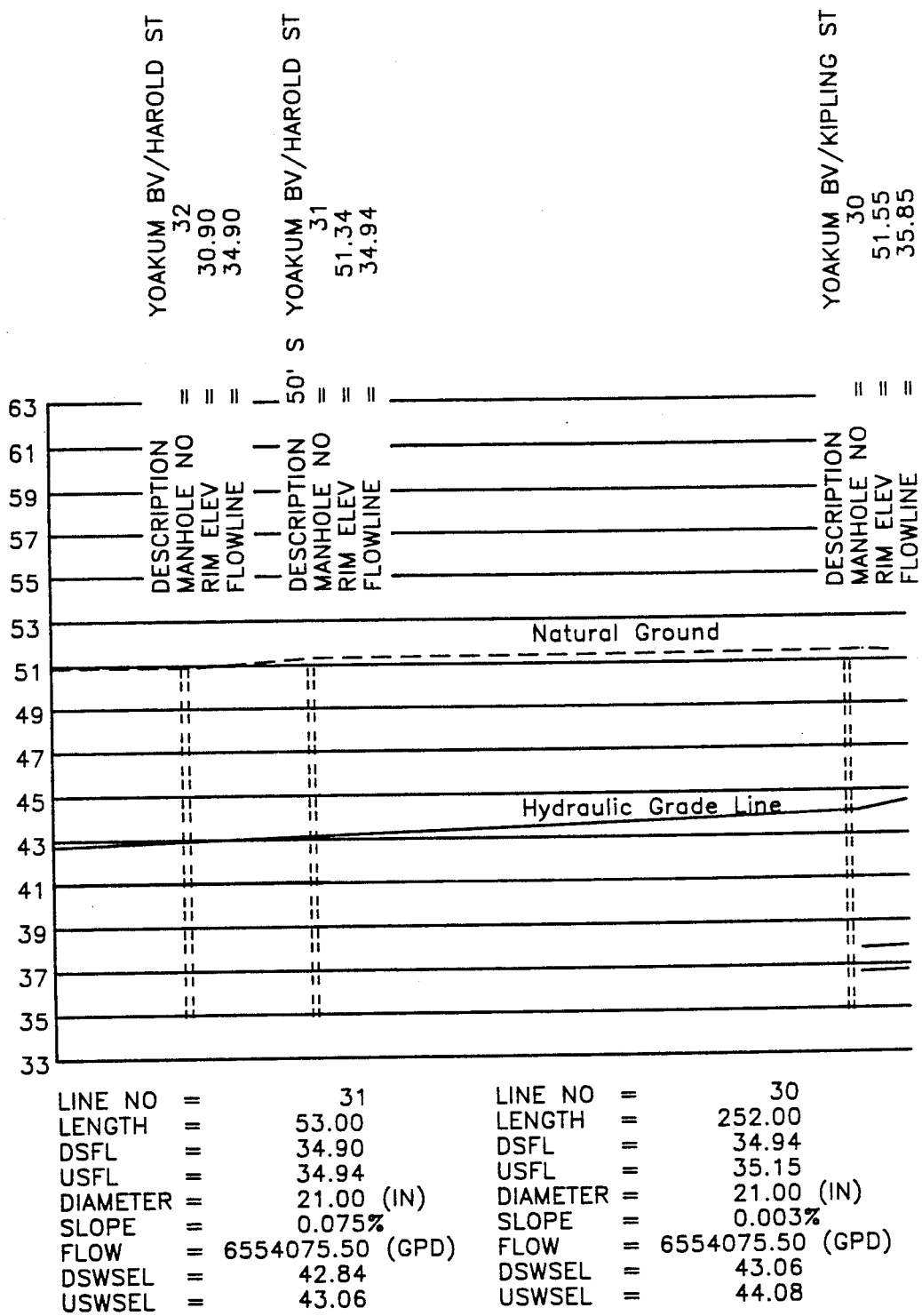
FIG. 17(a) and 17(b) illustrate the display produced by the water system profile computation.
Figure 17B:
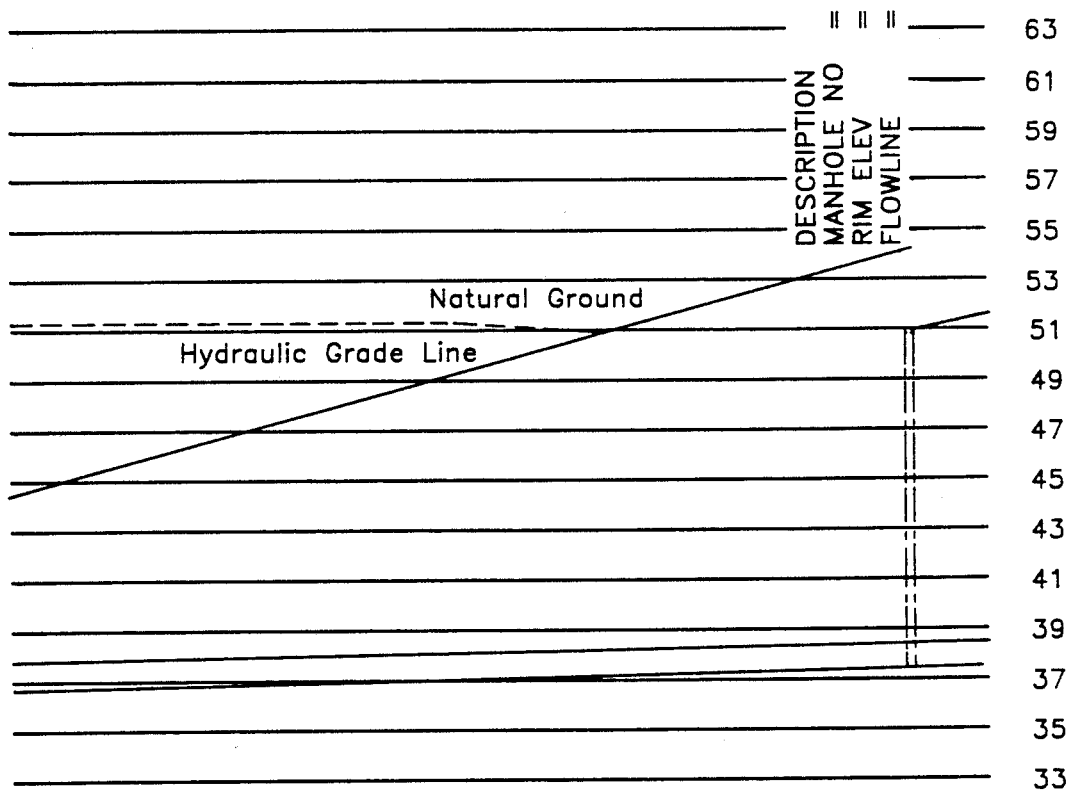

Subsequent to determining the surface hydraulic grade for pipes in the subservice areas under analysis, the system graphically displays the results. FIG. 16 illustrates a map display categorizing the status of pipes as "not filled", "surcharged", or "overflow" in a service area. FIG. 17 illustrates a surface hydraulic grade for a specific pipe segment.

The surface hydraulic grade permits the user to determine when a pipe segment is surcharged, that is when the pipe is full and water is rising in the manhole, and exactly by how much. The surface hydraulic grade is also designed to let the user determine when the pipes are in an overflow state, that is, surcharged to the extent that the water rises out of the manhole in an overflow. From review of the overflow and surcharge points in the wastewater collection system, together with the data regarding the various pipe segments, the user can determine where and how to go into the system and experiment with modifications of the system, such as laying parallel pipe between manholes, in order to eliminate undesired overflow situations. Alternately, the user could modify the flow of the pipe system. The user can then test these modifications in the existing system and in the system under forecasted conditions. The program will estimate the cost associated with the proposed modification of the pipe system based on the type, length, required depth and cost of the proposed pipe addition, as shown in FIG. 19(a) and the relative cost of performing any surface work, such as street maintenance, as shown in FIG. 19(b). The program operates so that the user does not destroy or modify the permanent database with experimental changes unless or until the user so specifies.

Figure 5:
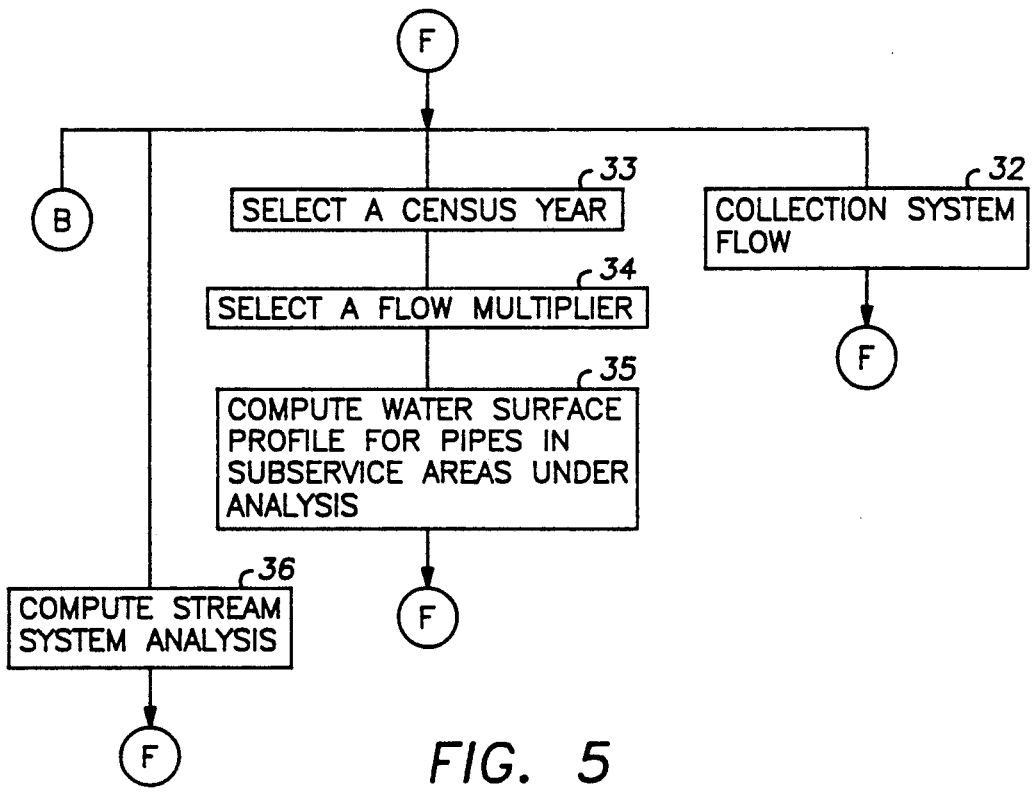
Figure 6:
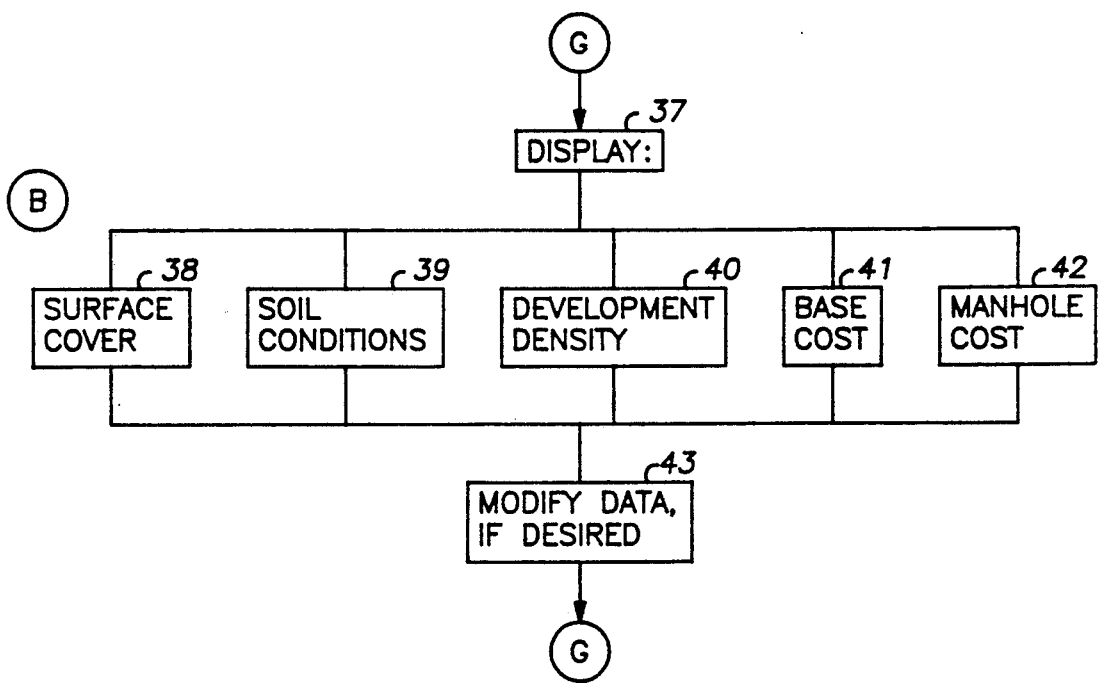
Figure 18:
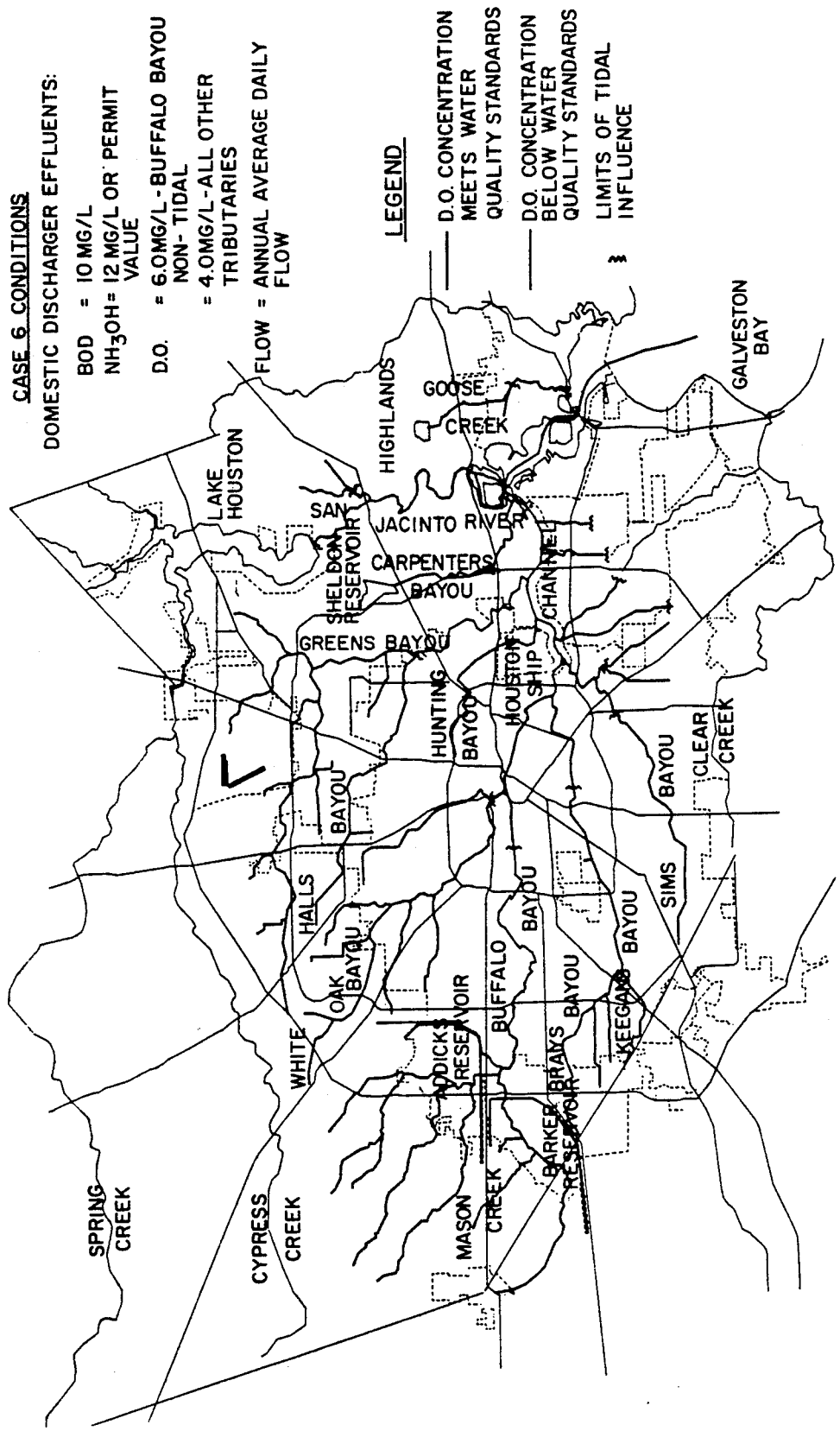
FIG. 18 illustrates the results of the stream system analysis routine.
Figure 20A:
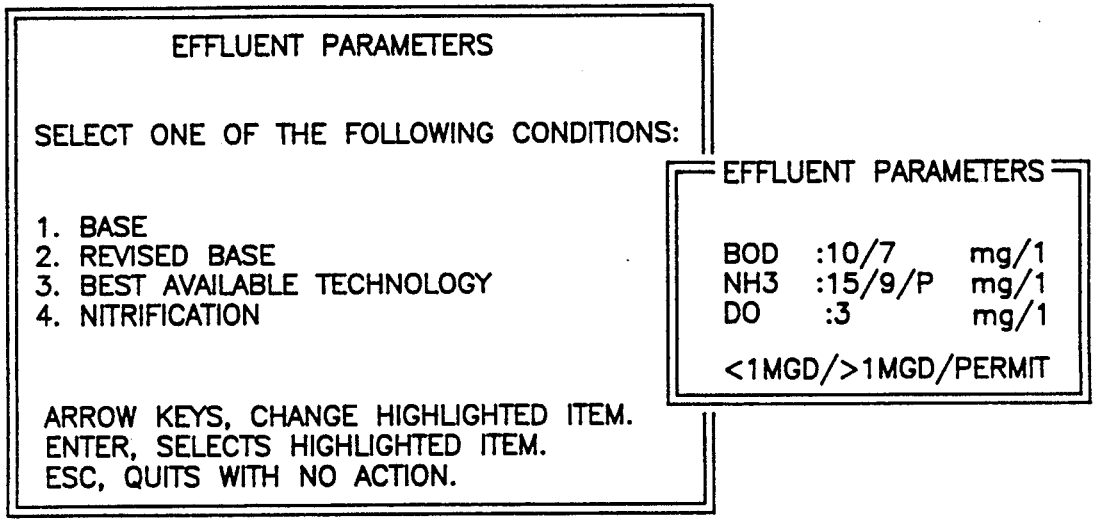
Figure 20B:
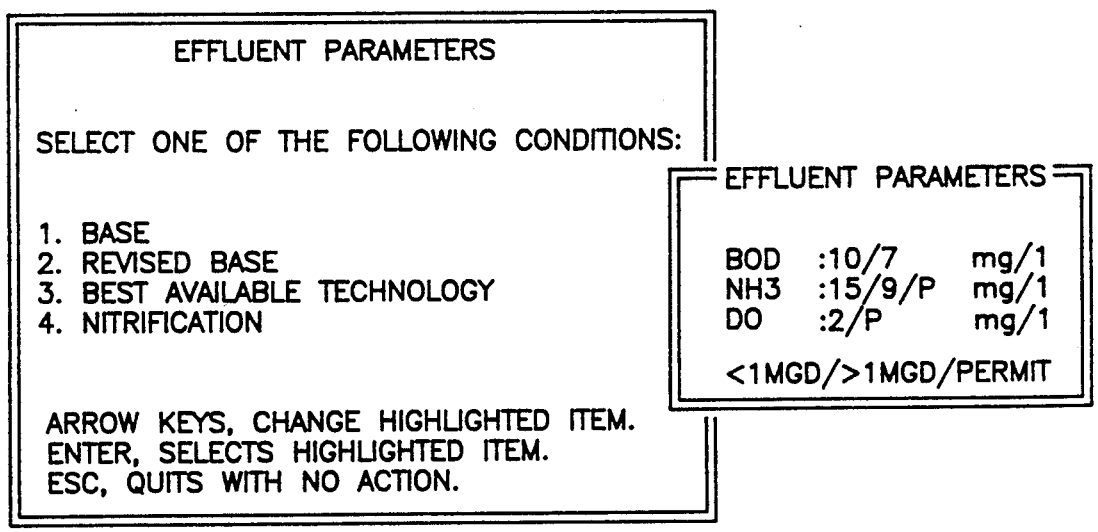

Returning to option point F, as illustrated by Box 41 of FIG. 5, the user may also elect to compute a stream system analysis. The program, based upon the computed wastewater flow into a treatment facility and the effluent parameters of the treatment facility, illustrated in FIGS. 20(a), 20(b), 20(c), and 20(d), computes the quantity and the quality of the discharge from the treatment facility into the stream system. FIG. 18 illustrates the type of display created by the stream system analysis.

From the foregoing, it would be apparent that there has been provided an improved management system for the management of a wastewater collection system. Various changes or alterations may be made in this management system without departing from the spirit of this invention. The changes are contemplated by the claims and within their scope and these claims define the present invention. Additionally, the present embodiment is intended to be taken as an illustration of this invention.

We claim:

1. A computer implemented method for managing a public utility wastewater collection system, the steps of which comprise:
   (a) establishing a computer-accessible database, the database including wastewater collection system parameters, the collection system parameters including pipe system parameters comprised of the location, with respect to a coordinate system, of sewer pipe and manholes, the elevation of the pipe and manholes, and pipe and manhole diameter; and the collection system parameters including predicted customer wastewater input into the system along the pipe;
   (b) selecting an area of the wastewater collection system for analysis;
   (c) selectively reviewing portions of the database information related to the selected area;
   (d) selectively modifying database parameters;
   (e) determining at least one wastewater flow for a portion of the pipe system under analysis;
   (f) determining at least one surface hydraulic grade for a portion of the pipe system under analysis; and
   (g) comparing the surface hydraulic grade against a predetermined criteria.

2. The method of claim 1, wherein the pipe system parameters include the location of waste treatment facilities along the pipe system and the back pressure on the pipe from the facility and the location of pumping stations along the pipe, and the head pressure on the pipe from the station.

3. The method of claim 2, wherein the collection area is subdivided into service areas by waste treatment facility and wherein the service areas are divided into subservice areas, the boundary of the service area and subservice area being defined by the pipe system and the wastewater customers of the pipe and being part of the wastewater collection system database.

4. The method of claim 3, wherein the user limits analysis to a portion of the collection area by limiting analysis to service areas or subservice areas.

5. The method of claim 4, wherein the pipe system parameters include the infiltration input and inflow input along the pipe system.

6. The method of claim 5, wherein the pipe system parameters include the material of the pipe and the roughness of the pipe.

7. The method of claim 6, wherein the wastewater collection system database includes the location of arbitrarily defined area polygons wherein the polygon area data includes the number and types of wastewater system customers in the tract; wherein the database further includes the estimated input into the pipe system for each wastewater customer type; and wherein the customer wastewater input into the system along the pipe is predicted from the census data and the data of estimated input per type; and wherein the predicted customer wastewater input into the system along the pipe is allocated to the subservice areas that overlap the census tract.

8. The method of claim 7, wherein the arbitrarily defined polygons include census tracts.

9. The method of claim 8, wherein the allocation is pro rata based upon relative area.

10. The method of claim 9, wherein the census data includes forecasted census data.

11. The method of claim 10, wherein the census tracts are comprised of municipal zoning areas.

12. The method of claim 11, wherein the pipe system parameters include the location of major easements and rights-of-way in the wastewater collection system area.

13. The method of claim 12, wherein the pipe system parameters include the location of major thoroughfares in the wastewater collection system area.

14. The method of claim 13, wherein the user reviews portions of the database by means of a map graphic display that includes locating, by coded color and symbol, service area boundaries and subservice area boundaries, pipe, manholes, water treatment facilities, pumping stations, and census tract boundaries.

15. The method of claim 14, wherein the map graphic display includes locating by coded color and symbol major thoroughfares, easements, and rights-of-way.

16. The method of claim 15, wherein each pipe segment, manhole, waste treatment facility, pumping station, service area, subservice area, and census tract is uniquely identified by a symbol-name.

17. The method of claim 16, wherein the user reviews portions of the database by reviewing the data associated with a symbol-name.

18. The method of claim 17, wherein the user modification of portions of the database includes removing or adding pipe and manholes and altering the boundaries of service areas and subservice areas.

19. The method of claim 18, wherein the user modification of portions of the database includes adding, deleting, or changing wastewater collection system data, including census data and estimated wastewater customer input per customer type.

20. The method of claim 19, wherein the computing of at least one wastewater flow figure includes computing a wastewater flow figure for each subservice area under analysis.

21. The method of claim 20, wherein the database includes previously calculated wastewater flow figures for subservice areas.

22. The method of claim 21, wherein the customer wastewater input to the system along the pipe for a subservice area is assigned to one manhole within the subservice area.

23. The method of claim 22, wherein the computing of a surface hydraulic grade includes multiplying wastewater flow figures by a factor to simulate peak use periods.

24. The method of claim 23, wherein the database includes cost of construction factors, said cost factors including type of construction and soil data.

25. The method of claim 24, that includes permitting the user to compute and display a cost of construction estimate for a user modification to the wastewater collection system.

* * * * *